United States Patent [19]

Briggs et al.

[11] Patent Number: 5,639,828

[45] Date of Patent: Jun. 17, 1997

[54] CARBAMATE OR ISOCYANATE COMPONENT, CARBAMATE-REACTIVE OR ACTIVE H COMPONENT AND EPOXIDE

[75] Inventors: Rodney L. Briggs, Linden; John W. Rehfuss, West Bloomfield; Walter H Ohrbom, Commerce Township; Gregory G. Menovcik, Farmington Hills, all of Mich.

[73] Assignee: BASF Corporation, Southfield, Mich.

[21] Appl. No.: 644,632

[22] Filed: Apr. 25, 1996

Related U.S. Application Data

[63] Continuation of Ser. No. 426,342, Apr. 21, 1995, abandoned.

[51] Int. Cl.$^6$ .............. C08L 33/14; C08L 61/28; C08L 63/02
[52] U.S. Cl. .............. 525/208; 525/100; 525/101; 525/103; 525/123; 525/108; 525/110; 525/114; 525/163; 525/175; 525/437; 525/438; 525/440; 525/452; 525/453; 525/454; 525/456; 525/523; 525/528; 525/533; 525/109; 525/142; 525/143; 525/474; 525/476; 525/486; 525/504; 525/510; 525/511; 525/520
[58] Field of Search .............. 525/208, 100, 525/101, 103, 123, 108, 110, 114, 163, 175, 437, 438, 440, 452, 453, 454, 456, 523, 528, 533, 109, 142, 143, 474, 476, 486, 504, 510, 511, 520

[56] References Cited

U.S. PATENT DOCUMENTS

| | | | |
|---|---|---|---|
| 3,853,597 | 12/1974 | Shimizu et al. | 117/75 |
| 4,169,825 | 10/1979 | Yapp et al. | 525/438 |
| 4,520,167 | 5/1985 | Blank et al. | 525/131 |
| 5,210,154 | 5/1993 | Weidemeier et al. | 525/438 |
| 5,218,018 | 6/1993 | Tominaga et al. | 525/438 |
| 5,292,833 | 3/1994 | Grahe et al. | 525/510 |
| 5,300,328 | 4/1994 | Rehfuss | 525/509 |
| 5,356,669 | 10/1994 | Rehfuss et al. | 428/500 |
| 5,373,069 | 12/1994 | Rehfuss et al. | 525/440 |
| 5,384,367 | 1/1995 | Swarup et al. | 525/169 |

FOREIGN PATENT DOCUMENTS

| | | |
|---|---|---|
| 2123285 | 11/1994 | Canada . |
| WO94/10211 | 5/1994 | European Pat. Off. . |
| 3726956A1 | 8/1987 | Germany . |
| 2186281 | 7/1987 | United Kingdom . |

OTHER PUBLICATIONS

Derwent accession No. 73–25833U/19 for Great Britain Patent No. 1,399,257, Bayer AG Jul. 1975.

Derwent accession No. 76–25567X/14 for Japanese Patent No. 51–20999, Dainippon Ink Chem Feb. 1976.

"Low temperature–curable coating compositions," Chemical Abstracts No. 107:117063s for Japanese Patent No. 61-258,869, May 10, 1985.

*Primary Examiner*—Robert E. Sellers
*Attorney, Agent, or Firm*—Paul L. Marshall

[57] ABSTRACT

A curable coating composition is described comprising two components that are reactive with one another upon curing to form urethane linkages. The urethane-forming components are an active hydrogen groups-containing component and a polyisocyanate, or a carbamate groups-containing component and a carbamate group-reactive component. The composition further comprises a third component that includes one or more epoxide groups. Coatings prepared with this coating composition can be cured and coated with additional coating(s), providing good intercoat adhesion to the subsequent coating.

8 Claims, No Drawings

CARBAMATE OR ISOCYANATE COMPONENT, CARBAMATE-REACTIVE OR ACTIVE H COMPONENT AND EPOXIDE

This is a continuation of application Ser. No. 08/426,342 abandoned.

FIELD OF THE INVENTION

This invention relates to curable coating compositions, and in particular to compositions to produce urethane-crosslinked coatings for use in multilayer coatings.

BACKGROUND OF THE INVENTION

Coating compositions are often divided into thermoplastic and thermoset. Thermoplastic coating compositions utilize high molecular weight polymers dispersed in an organic or aqueous solvent. After the coating composition is applied to a substrate, the solvent is removed and the polymers set up to form a film. Thermoset or curable coating compositions utilize two components that are reactive with one another under certain cure conditions. The reactive groups on these components are referred to as 'functional groups'. After the composition containing these components is applied, the coated substrate is subjected to cure conditions, causing the functional groups to react and form a cured film of a crosslinked matrix.

Various combinations of functional groups have been used in the art for curable coating compositions. One widely used combination utilizes OH-functional groups and the alkylol groups on aminoplast resins. These functional groups react to form an ether bridges in the crosslinked coating. Another combination utilizes acid functional groups and epoxy functional groups, which react to form ester bridges in the crosslinked coating.

Curable coating compositions that cure via the formation of urethane bridges in the crosslinked coating have also been used in the art. Urethane bonds are often desirable for their durability, resistance to attack by various agents in the environment, impact resistance, and other physical properties such as stress release. Urethane bridges can be formed by various combinations of functional groups, such as OH functional groups and isocyanate functional groups, carbamate groups and aminoplast resins, or cyclic carbonate groups and amino groups.

In many coating applications, it is often necessary to apply an additional coating on top of an already-cured coating. This may be done to achieve certain visual or physical properties, or it may be necessary to repair areas where the cured coating has been damaged or where coating defects exist. In such cases, it is important that the coating applied on top of the cured coating have adequate adhesion to the cured coating. Even when the cured coating is sanded prior to application of the additional coating, the adhesion factor is still a concern with regard to overspray areas onto unsanded coating surfaces.

Intercoat adhesion can be of particular concern with regard to cured urethane coatings. Accordingly, the present invention is directed toward such a curable coating composition having good intercoat adhesion properties.

SUMMARY OF THE INVENTION

Therefore, the present invention provides a curable coating composition comprising two components that are reactive with one another upon curing to form urethane linkages. The composition further comprises a third component that includes one or more epoxide groups. Coatings prepared with this coating composition can be cured and coated with additional coating(s), providing good intercoat adhesion to the subsequent coating.

DESCRIPTION OF THE PREFERRED EMBODIMENTS

Various combinations of components can be used as the two components that are reactive with each other to form urethane linkages according to the present invention. As used herein, the term "urethane linkage" refers to a linkage in the matrix of a cured coating having the formula:

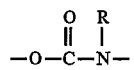

where R is H, substituted or unsubstituted alkyl preferably of 1 to 6 carbon atoms, or substituted or unsubstituted cycloalkyl, preferably up to 6 ring carbon atoms.

One such combination utilizes a carbamate-functional material as one of the components. A variety of carbamate-functional materials may be used. These include materials described in WO 94/10211 and U.S. Pat. No. 5,356,669, the disclosures of which are incorporated herein by reference.

A carbamate-functional polymer may be used as the carbamate-functional material in the practice of the present invention. Carbamate-functional polymer components used in the composition of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing carbamate-functional polymers is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing carbamate-functional polymers involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A preferred approach is a transcarbamylation or transesterification reaction of a hydroxy-functional polymer with an alkyl carbamate or hydroxyalkyl carbamate. A more difficult, but feasible way of preparing the polymer would be to trans-esterify an acrylate polymer with a hydroxyalkyl carbamate.

Other polymers may be used as well. For example, a carbamate-functional polyurethane can be prepared as is described in U.S. patent application Ser. No. 08/098,169, the disclosure of which is incorporated herein by reference. A carbamate-functional polyester can be prepared as described in JP 51/4124, the disclosure of which is incorporated herein by reference.

Carbamate-functional polymers can have a molecular weight of 2000–20,000, and preferably from 4000–6000. Molecular weight as used herein means weight average molecular weight, and can be determined by the GPC method using a polystyrene standard. The carbamate content of the polymer, on a molecular weight per equivalent of carbamate functionality, will generally be between 200 and 1500, and preferably between 300 and 500.

One class of carbamate-functional polymer component can be represented by randomly repeating units according to the following formula:

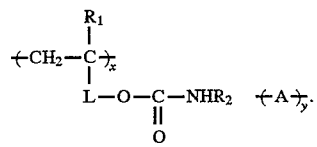

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the above formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

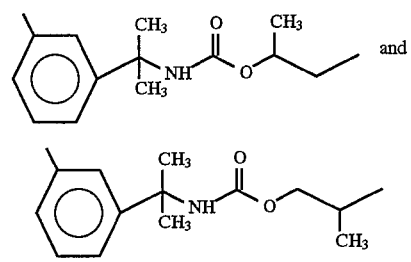

$-(CH_2)-$, $-(CH_2)_2-$, $-(CH_2)_4-$, and the like. In one preferred embodiment, $-L-$ is represented by $-COO-L'-$ where L' is a divalent linking group. Thus, in a preferred embodiment of the invention, the carbamate-functional polymer component is represented by randomly repeating units according to the following formula:

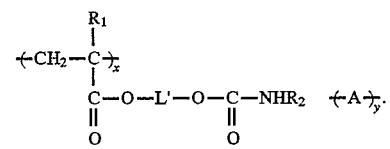

In this formula, $R_1$, $R_2$, A, x, and y are as defined above. L' may be a divalent aliphatic linking group, preferably of 1 to 8 carbon atoms, e.g., $-(CH_2)-$, $-(CH_2)_2-$, $-(CH_2)_4-$, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an $-NHCOO-$ urethane linkage as a residue of the isocyanate group.

Lower molecular weight carbamate-functional materials, such as oligomeric or non-polymeric materials may also be used in the practice of the present invention. Such compounds can be prepared in a variety of ways.

One way to prepare such carbamate-functional materials is to react an alcohol ('alcohol' is defined herein as having one or more OH groups) with a urea to form a compound with carbamate groups. This reaction is accomplished by heating a mixture of the alcohol and urea. Another technique is the reaction of a polyol with a monoisocyanate (e.g., methyl isocyanate) to form a compound with multiple secondary carbamate groups or to react an alcohol with cyanic acid to form a compound with primary carbamate groups(s) (i.e., unsubstituted carbamates). This reaction is also performed under heat, preferably in the presence of a catalyst as is known in the art. Carbamates may also be prepared by reaction of an alcohol with phosgene and then ammonia to form a compound having primary carbamate group(s), or by reaction of a polyol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol or hydroxyalkyl carbamate is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful in the practice of the invention. They generally have from 1 to 160 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Another approach is to react an isocyanate (preferably a diisocyanate, e.g., HDI, IPDI) with a compound such as hydroxypropyl carbamate to form a carbamate-capped polyisocyanate derivative as described in U.S. patent application Ser. No. 08/098,176. The polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and aliphatic diisocyanates include the various isomers of toluene diisocyanate, meta-xylenediioscyanate and paraxylenediisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition, the various isomers of α,α,α',α'-tetramethyl xylene diisocyanate can be used. Biurets of isocyanates such as DESMODUR® N100 from Mobay may also be useful.

In one embodiment of the invention, a polyisocyanate is reacted with a compound containing an isocyanate-reactive group and a carbamate group, e.g., a hydroxyalkyl carbamate such as hydroxypropyl carbamate or hydroxyethyl carbamate. Alternatively, the polyisocyanate may be adducted with substituents that have the capability of forming carbamate groups after reaction with the polyisocyanate compound is completed. For example, the polyisocyanate can be reacted with a compound having an active hydrogen group (e.g., hydroxyl) and a cyclic carbonate group (e.g., the reaction product of glycidol and $CO_2$), and the cyclic carbonate groups then reacted with ammonia to form the carbamate functional groups. Alternatively, the polyisocyanate can be reacted with an active hydrogen group (e.g., hydroxyl) and an epoxy group, and then with $CO_2$ to convert the epoxy to cyclic carbonate, and the cyclic carbonate groups then reacted with ammonia to form the carbamate functional groups.

Another method of synthesis is to first react the isocyanate groups on a polyisocyanate with a compound having a group that is reactive with isocyanate and also a non-NCO functional group. This adduct is then reacted with a compound comprising at least one carbamate group or group that can be converted to carbamate and at least one group reactive with the non-NCO functional groups. Examples of non-NCO functional groups include carboxyl, epoxy, hydroxyl, amino. For example, an OH-functional adduct (which can be formed by reacting a polyisocyanate with an amino alcohol) can be reacted with the oxygen of a COO portion of the carbamate group or an alkyl carbamate or with the methylol group of methylol acrylamide ($HO-CH_2-NH-CO-CH=CH_2$). In the case of the COO group on an alkyl carbamate, the hydroxyl group on the polyurethane undergoes a transesterification with the COO group, resulting in the carbamate group being appended to the polyurethane. In the case of methylol acrylamide, the unsaturated double bond is then reacted with peroxide to form an epoxy group. The epoxy groups are then reacted with $CO_2$ to form cyclic carbonate groups, which are converted to carbamate groups by reaction with ammonia. Alternatively, an acid-functional polyisocyanate (which can be formed by reaction of a polyisocyanate with a hydroxy-functional carboxylic acid) can be reacted with acetic anhydride to generate an anhydride-functional triisocyanurate, which can then be reacted with an hydroxyalkylcarbamate.

The above-described polyisocyanates are adducted with compounds containing a carbamate group or group that can be converted to carbamate and a group that is reactive with the NCO- or non-NCO-functional group on the polyisocyanate. Carbamate-containing compounds that can be adducted onto the NCO groups of a diisocyanate or an isocyanurate are preferably active hydrogen-containing carbamates such as hydroxyalkyl carbamates (e.g., hydroxypropyl carbamate or hydroxyethyl carbamate). Compounds containing groups that can be converted to carbamate and groups that are reactive with NCO include active hydrogen-containing cyclic carbonate compounds convertible to carbamate by reaction with ammonia (e.g., the reaction product of glycidol and $CO_2$), monoglycidyl ethers (e.g., Cardura E®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia.

Non-polymeric or oligomeric carbamate-functional compounds will generally have a molecular weight of 75–2000, and preferably from 75–1500. As used herein, molecular weight means weight average molecular weight. Molecular weight can be determined by the GPC method.

A number of materials can be used as the component to react with carbamate to form a urethane linkage as defined above. These include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), phenol/formaldehyde adducts, and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in U.S. Pat. No. 5,300,328.

Another combination of components that can be used to form urethane linkages in the practice of the present invention utilizes a polyisocyanate as one of the components.

The polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylenediioscyanate and paraxylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of $\alpha,\alpha,\alpha',\alpha'$-tetramethyl xylene diisocyanate can be used. Also useful as the polyisocyanate are isocyanurates such as DESMODUR® 3300 from Miles, Inc. and biurets of isocyanates such as DESMODUR® N100 from Miles, Inc. The polyisocyanates may be unblocked, in which case the coating composition should be utilized as a 2K, i.e., the reactive components combined shortly before application, or they may be blocked. Any known blocking agents, such as alcohols or oximes, may be used.

Polyisocyanates can be reacted with any of a number of active hydrogen-containing components to form urethane linkages. Active hydrogen-containing functional groups are well-known in the art. Such groups include, for example, hydroxyl groups, amino groups, thiol groups, hydrazide groups, and activated methylene groups.

The active hydrogen component to react with the polyisocyanate may be polymeric, oligomeric, or non-polymeric. In one preferred embodiment, the component is polymeric. Useful polymer resins include, for example, acrylic polymers, modified acrylic polymers, polyesters, polyepoxides, polycarbonates, polyurethanes, polyamides, polyimides, and polysiloxanes, all of which are well-known in the art. Preferably, the component is a polymeric or oligomeric is an acrylic, modified acrylic or polyester. More preferably, the component is an acrylic polymer or oligomer resin.

In one preferred embodiment of the invention, the component to react with the polyisocyanate is an acrylic resin, which may be a polymer or oligomer. The acrylic polymer or oligomer preferably has a molecular weight of 500 to 1,000,000, and more preferably of 1500 to 50,000. As used herein, "molecular weight" refers to weight average molecular weight, which may be determined by the GPC method using a polystyrene standard. Acrylic polymers and oligomers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxyfunctional acrylic monomers that can be used to form such resins include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylaminoethylacrylate. Other acrylic monomers having active hydrogen functional groups in the ester portion of the monomer are also within the skill of the art.

Modified acrylics can also be used. Such acrylics may be polyester-modified acrylics or polyurethane-modified acrylics, as is well-known in the art. Polyester-modified acrylics modified with e-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having active hydrogen groups such as hydroxyl groups can also be used as the polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Although polymeric or oligomeric active hydrogen components are often preferred, lower molecular weight non-polymeric active hydrogen components may also be used in some applications, for example aliphatic polyols (e.g., 1,6-hexane diol), hydroxylamines (e.g., monobutanolamine), and the like.

The composition of the present invention also comprises a component that includes one or more epoxide groups. Epoxides are well-known in the art. The epoxide may be of the general formula:

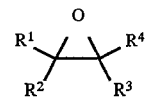

where R1, R2, R3, and R4 are each independently H (with the proviso that at least one of R1–R4 is other than H), an organic radical, which may be polymeric or non-polymeric and may contain unsaturation and/or heteroatoms, or one of R1 or R2 together with one of R3 or R4 may form a cyclic ring, which may contain unsaturation and/or heteroatoms.

Although essentially any epoxide can be used in the practice of the present invention, the epoxide is preferably substantially free of groups that are reactive with either of the two components that are reactive with one another to form urethane linkages. By substantially free of such groups, it is meant that the degree of reaction between either of the two components that are reactive to form urethane linkages and any reactive component on the epoxide is sufficiently low so as to avoid any undesired adverse impact on the intercoat adhesion properties of the coating.

Useful epoxides can be prepared from alcohols, e.g., butanol, trimethylol propane, by reaction with an epihalohydrin (e.g., epichlorohydrin), or by reactio of an allyl group with peroxide. Oligomeric or polymeric polyepoxides, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Epoxides can also be prepared by reacting an isocyanate-terminated component such as a monomeric polyisocyanate or polymer or oligomer with glycidol. Other known polyepoxides, e.g., epoxy-novolacs, may also be used.

In one preferred embodiment, the epoxide is an acrylic-containing polymer or oligomer, preferably deriving its epoxy groups from glycidyl methacrylate monomer, glycidyl acrylate, allyl glycidyl ether, cyclohexyl monoepoxyy methacrylate, the epoxide of the dimer of cylopentadiene methacrylate, or epoxidized butadiene, more preferably glycidyl methacrylate. In another preferred embodiment, both the epoxy-containing component and one of the components that reacts to form urethane linkages are acrylic polymers or oligomers. The epoxide is preferably present in the coating composition in an amount of from 0.0001 to 0.05 equivalents of epoxy per 100 g of resin.

In a preferred embodiment, the composition of the present invention also includes a component, which may be the same as or different from any of the other components, comprising one or more acid groups. Any type of acid may be used, including Bronsted or Lewis acids. Acids may be inorganic acids (e.g., phosphoric), but organic acids are preferred. Various types of organic acids may be used, such as phenolics, cresylics, or hydroxy acids (e.g., citric acid, phenol, cresol, tartaric acid, amino acids), or carboxylic acids, with carboxylic acids being preferred.

Organic acids may be monofunctional or polyfunctional. In one embodiment, the acid is monofunctional. Such monofunctional acids include octanoic acid, benzoic acid, acetic acid, hexanoic acid, or benzylic acid.

Polyfunctional organic acid components may also be used. The organic acid component can be a monomeric polyacid or an adduct thereof, or it can be a polymeric or oligomeric polyacid. For monomeric polyacids, usually liquid polyacids are employed. Non-limiting examples of these acids are succinic acid, glutaric acid, adipic acid, azelaic acid, oxalic acid, phthalic acid, isophthalic acid, hexahydrophthalic acid, methylhexahydrophthalic acid, maleic acid chlorendic acid and the like. Polyacids of higher acid functionality, e.g., trimellitic acid, tricaballylic acid, aconitic acid and the like, can also be employed.

Higher molecular weight polyacid-containing adducts can also be used. Examples of useful polyacid-containing adducts are acid-containing polyesters, acid-containing polyurethanes, acid-containing acrylics, and the like. An example of the acid-containing polyesters can be prepared by reacting an excess of a monomeric polyacid as described above with a polyol. Alternatively, in a preferred embodiment, a cyclic anhydride (e.g., a 1,2-acid anhydride such as hexahydrophthalic anhydride and alkylhexahydrophthalic anhydride) can be reacted with a polyol, such as 1,6-hexanediol, trimethylol propane and polycaprolactone triol to form a half-ester polyacid.

Illustrative examples of acid containing acrylics are copolymers of an ethylenically unsaturated monomer containing an acid group. The copolymers may be prepared by using conventional techniques such as free radical polymerization or anionic polymerization in, for example, a batch or semi-batch process. One or more other ethylenically unsaturated monomers that do not contain an acid group can be incorporated into the acid-containing polymer.

Examples of the ethylenically unsaturated monomers containing an acid group can be acrylic acid, methacrylic acid, itaconic acid, and maleic acid. Other copolymerizable monomers can be alkyl ester of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; vinyl monomers such as styrene, vinyl toluene and the like. Copolymerizable monomers containing groups which will react with the acid groups under the addition reaction conditions chosen should be avoided so as to produce an ungelled product.

Useful anhydrides include monomeric anhydrides such as alkyl hexahydrophthalic anhydride wherein the alkyl group has up to 7 carbon atoms, e.g., methylhexahydrophthalic anhydride, succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, tetrachlorophthalic anhydride, endomethylene tetrahydrophthalic anhydride, chlorendic anhydride, itaconic anhydride, citraconic anhydride, and maleic anhydride. The anhydride may also be polymeric, such as copolymers of maleic anhydride with other ethylenically unsaturated monomers. Such copolymers are preferably formed in the same manner as the acid-containing copolymers previously discussed.

The acid component is preferably present in an amount of from 0 to 0.5 equivalents of acid per 100 g of resin solids, and more preferably 0.00008 to 0.008 equivalents of acid per 100 g of resin solids.

In one preferred embodiment of the invention, one of the components that are curable to form urethane linkages is an acrylic resin, and the component that includes one or more epoxy groups is an epoxy acrylic resin. Such an epoxy acrylic resin preferably includes one or more of the components lauryl methacrylate, 2-ethylhexyl acrylate, 2-ethylhexyl methacrylate, or butyl acrylate. The epoxy equivalent weight, molecular weight, and glass transition temperature of the epoxy acrylic resin are adjusted by varying the monomer lineup to optimize the performance in the particular coating composition by techniques known in the art.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to all of the components in the composition. In general, depending on the solubility characteristics of various components, the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The coating composition used in the practice of the invention may include, independent of the acid component described above, a catalyst such as an acid catalyst to enhance the cure reaction. For example, when a polycarbamate and aminoplast compounds are used as the components to form urethane linkages, a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. When a polyisocyanate and a polyol are used as the components to form urethane linkages, organometallic catalysts, such as dibutyltin laurate, may be used. Other catalysts that may be useful in the composition of the invention include Lewis acids, zinc salts, and aluminum salts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

The coating composition of the invention may be clear or it may be a pigmented paint coating. When it is pigmented, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components in the coating composition (i.e., a P:B ratio of 0.1 to 1).

In one preferred embodiment, the coating composition according to the invention is used as the clearcoat of a composite color-plus-clear coating. Pigmented basecoat compositions useful therewith include any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 82° C. and 177° C. The curing time will vary depending on the particular components used, and physical parameters such as the thickness of the layers, however, typical curing times range from 15 to 60 minutes.

The invention is further described in the following examples.

PREPARATION 1

A coating composition was prepared having the following formulation:

| Component | Parts by weight |
| --- | --- |
| carbamate-functional acrylic resin[1] | 129.18 |
| Resimene ® 747 melamine resin | 13.61 |
| Tinuvin ® 384B UVA | 3.16 |
| Tinuvin ® 123 HALS | 1.50 |
| Nacure ® 5225 blocked dodecylbenzene sulfonic acid | 0.65 |
| isobutanol | 8.00 |
| amyl acetate | 28.00 |
| 3-ethoxyethyl proprionate | 28.00 |

PREPARATION 2

A coating composition was prepared having the identical composition as Preparation 1 with the addition of 1.65 parts by weight of an epoxy-functional acrylic polymer having a weight average molecular weight of about 20,000 with a monomer lineup (by weight) of 38.5% glycidyl methacrylate, 59.5% 2-ethylhexyl acrylate, 1% styrene, and 1% methyl methacrylate.

PREPARATION 3

A coating composition was prepared having the identical composition as Preparation 2 with the addition of 0.29 parts by weight of octanoic acid. [1]An acrylic resin having a weight average molecular weight of about 6500, a carbamate equivalent weight of about 450, where the source of the carbamate functionality is a polymer repeat unit of the formula:

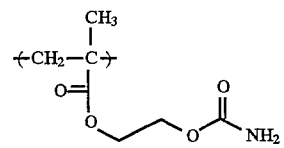

EXAMPLE 1

The coating compositions of Preparation 1, Preparation 2, and Preparation 3 were coated onto a primed steel panel as the clearcoat of a basecoat/clearcoat composite coating having a black pigmented basecoat that utilized a hydroxy-functional acrylic resin and a melamine resin crosslinker. The panels were cured as described below for each of the intercoat adhesion tests.

High-Bake Repair (HBR) Test

The coated panels were cured for 20 minutes at 132° C. and allowed to cool. The panels were then coated with a wet-on-wet basecoat/clearcoat coating having a clearcoat that was identical to Preparation 1 and a basecoat composition having the following composition:

| Component | Parts by Weight |
| --- | --- |
| OH-functional acrylic resin[2] dispersion | 23.66 |
| acrylic microgel dispersion | 26.11 |
| Resimene ® 755 melamine resin | 17.18 |
| Black pigment grind paste | 21.82 |
| Acrylic polymer flow additive | 0.15 |
| N-methyl pyrrolidone | 1.40 |
| UV and HALS solution | 2.88 |
| Nacure ® 5225 blocked acid catalyst | 1.62 |
| ethanol | 1.90 |
| n-butyl acetate | 3.27 |

[2]Acrylic resin having a weight average molecular weight of about 8000 comosed of 15 parts by weight hydroxyethyl acrylate (modified with 30 parts by weight ε-caprolactone), 20 parts by weight styrene, 16 parts by weight 2-ethylhexyl acrylate, 16 parts by weight n-butyl methacrylate, and 3 parts by weight acrylic acid.

The panels were cured for 20 minutes at 132° C. and cooled. The panels were then subjected to an adhesion test as described in ASTM 3359 involving scribing a portion of the coating with a cross-cut pattern and applying and removing pressure-sensitive adhesive tape. The panels were evaluated for pass/fail with a pass representing 10% or less of the second base/clear coating being removed during the test and a fail being greater than 10% of the second base/clear coating being removed during the test.

Intercoat Adhesion (ICA) III Test

The panels were processed and tested as described for the HBR test, except the first base/clear coating was cured for 30 minutes at 146° C. and the second base/clear coating was cured for 20 minutes at 127° C.

Intercoat Adhesion (ICA) IV Test

The panels were processed and tested as described for the HBR test, except the first base/clear coating was cured for 60 minutes at 146° C. and the second base/clear coating was cured for 20 minutes at 127° C.

The results are described in Table I below:

TABLE I

| Preparation | HBR | ICA III | ICA IV |
| --- | --- | --- | --- |
| 1 (comparison) | Fail | Fail | Fail |
| 2 (invention) | Pass | Pass | Fail |
| 3 (invention) | Pass | Pass | Pass |

PREPARATION 4

A composition was prepared having the following formulation:

| Component | Parts by weight |
| --- | --- |
| hydroxy-functional acrylic resin[3] | 135.34 |
| Tinuvin ® 1130 UVA | 4.96 |
| Tinuvin ® 123 HALS | 2.36 |
| 5% BYK ® 320 solution | 6.05 |
| butyl cellosolve acetate | 14.14 |
| diisobutyl ketone | 7.85 |
| butylcarbitol acetate | 13.64 |

[3]An acrylic resin having a weight average molecular weight of about 4000, a hydroxy equivalent weight of about 310, where the source of the hydroxy functionality is a polymer repeat derived from hydroxypropyl methacrylate

PREPARATION 5

A composition was prepared having the identical composition as Preparation 1 with the addition of 0.847 parts by weight of the epoxy-functional acrylic polymer from Preparation 2.

PREPARATION 6

A composition was prepared having the identical composition as Preparation 1 with the addition of 2.54 parts by weight of the epoxy-functional acrylic polymer from Preparation 2.

PREPARATION 7

A composition was prepared having the identical composition as Preparation 1 with the addition of 4.23 parts by weight of the epoxy-functional acrylic polymer from Preparation 2.

PREPARATION 8

A composition was prepared having the following formulation:

| Component | Parts by Weight |
| --- | --- |
| isocyanurate of isophorone diisocyanate | 97.79 |
| isocyanurate of hexamethylene diisocyanate | 35.06 |
| diisobutyl ketone | 21.66 |

EXAMPLE 2

The coating compositions of Preparation 4, Preparation 5, Preparation 6, and Preparation 7 were used as component "A" of a 2K clearcoat composition and combined Preparation 8 as component "B", and coated onto a primed steel panel as the clearcoat of a basecoat/clearcoat composite coating having a black pigmented basecoat that utilized a hydroxy-functional acrylic resin and a melamine resin crosslinker. The panels were cured for 20 minutes at 129° C., cooled, and subjected to the following tests.

The panels were then subjected to the ICA III and ICA IV tests as described in Example 1 using a basecoat that was similar to Example 1 and a clearcoat that was the same as Preparation 4 for the clearcoat of the second base/clear coating. The results are shown in Table II below.

TABLE II

| Preparation | ICA III | ICA IV |
| --- | --- | --- |
| 4 + 8 (comparison) | Fail | Fail |
| 5 + 8 (invention) | Pass | Fail |
| 6 + 8 (invention) | Pass | Fail |
| 7 + 8 (invention) | Pass | Pass |

The results from Examples 1 and 2 that the addition of the epoxy component to the urethane-crosslinking clearcoat compositions improved aspects of intercoat adhesion as measured by certain intercoat adhesion tests. Further improvements in intercoat adhesion for certain coating compositions could be achieved by the use of higher amounts of the epoxy component and/or by the addition of an acid component.

The invention has been described in detail with reference to preferred embodiments thereof. It should be understood, however, that variations and modifications can be made within the spirit and scope of the invention.

What is claimed is:

1. A curable coating composition comprising two components that are reactive with one another upon curing to form urethane linkages comprising:

(A) a polymer comprising a plurality of carbamate groups, (B) a component comprising a plurality of groups that are reactive with the carbamate groups on component (A), and a third component containing one or more epoxide groups which is substantially free of groups that are reactive with polymer (A) and component (B).

2. A curable coating composition according to claim 1 wherein component (B) is an aminoplast resin.

3. A curable coating composition according to claim 2 wherein component (B) is a melamine resin.

4. A curable coating composition according to claim 1 wherein component (A) is a carbamate-functional acrylic resin.

5. A curable coating composition according to claim 4 wherein said third component is an epoxy group-containing acrylic resin.

6. A curable coating composition according to claim 5 wherein the epoxy groups on said epoxy group-containing acrylic resin are derived from glycidyl methacrylate, glycidyl acrylate, allyl glycidyl ether, cyclohexyl monoepoxy methacrylate, the epoxide of the dimer of cyclopentadiene methacrylate, and epoxidized butadiene.

7. A curable coating composition according to claim 6 wherein said epoxy groups are derived from glycidyl methacrylate.

8. A curable coating composition according to claim 1 wherein said third component is selected from the group consisting of epoxy group-containing acrylic resins, epoxy-terminated DGEBPA resins, epoxy novolac resins, epoxy group-containing polyurethane resins, and epoxy group-containing polyester resins.

* * * * *